Figure 1:
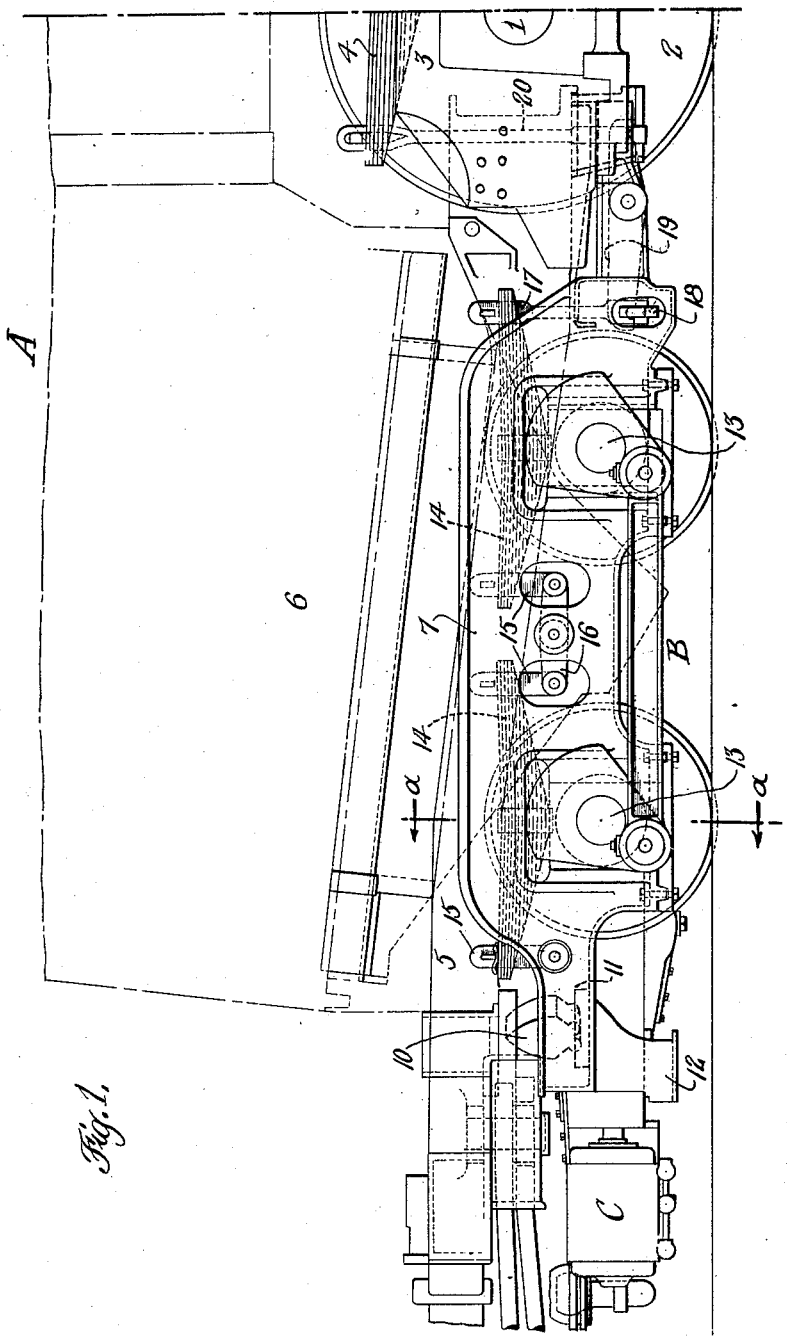

March 10, 1931.  H. S. VINCENT  1,795,456
LOCOMOTIVE CONSTRUCTION
Filed Dec. 11, 1924  2 Sheets-Sheet 1

INVENTOR
Harry S. Vincent
BY
Synnestvedt & Lechner
ATTORNEYS

March 10, 1931.　　　H. S. VINCENT　　　1,795,456
LOCOMOTIVE CONSTRUCTION
Filed Dec. 11, 1924　　　2 Sheets-Sheet 2
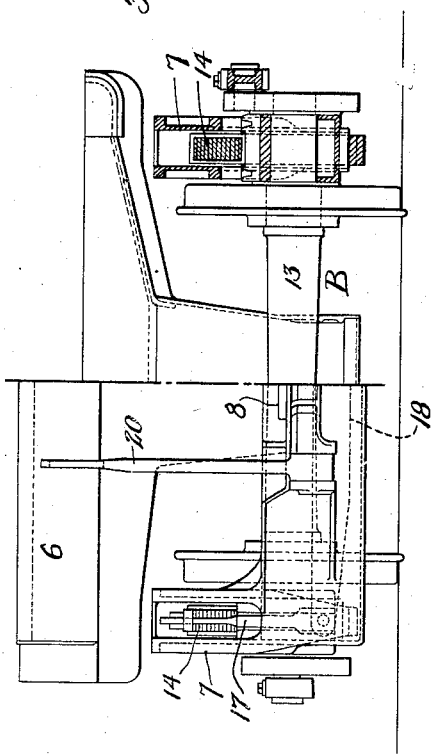
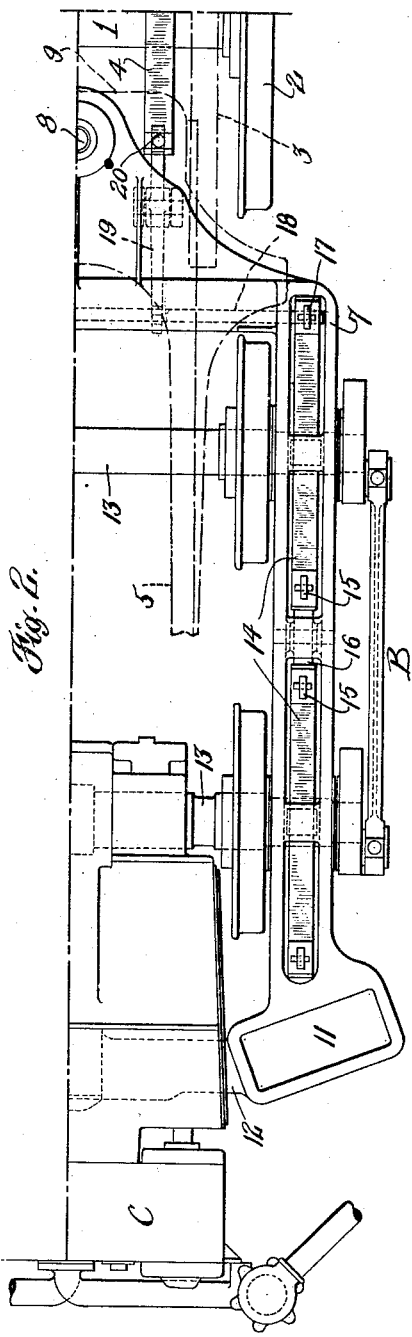
INVENTOR
Harry S. Vincent
BY
Symestvedt + Lechner
ATTORNEYS Patented Mar. 10, 1931

1,795,456

UNITED STATES PATENT OFFICE

HARRY S. VINCENT, OF RIDGEWOOD, NEW JERSEY, ASSIGNOR TO FRANKLIN RAILWAY SUPPLY COMPANY, A CORPORATION OF DELAWARE

LOCOMOTIVE CONSTRUCTION

Application filed December 11, 1924. Serial No. 755,122.

This invention relates to an improvement in locomotive construction and particularly to an improvement associated with locomotive trailing trucks. It is especially useful in locomotives having four wheeled trailing trucks and as embodied in such a truck I have herein illustrated my invention.

The principal object of the invention is to overcome certain objections to the four wheeled trailing truck by reducing to a minimum the distance between the rear driving wheels of the locomotive and the front wheels of the truck.

Heretofore locomotives equipped with four wheeled trailer trucks have had a rather long wheel base and I provide a construction which reduces this wheel base to a considerable extent, bringing it down, in fact, to what is apparently a minimum distance.

At the same time I provide for a very flexible equalizing system in which the weight of the truck frame and connected parts becomes a part of the live load of the locomotive.

I accomplish the foregoing by means of certain improvements in construction particularly as relates to the spring rigging.

The foregoing together with such other objects as are incident to my invention or may appear hereinafter I obtain by means of a construction which is illustrated in preferred form in the accompanying drawings, wherein Figure 1 is a partial side elevation of the rear end of a locomotive which embodies my invention; Figure 2 is a half plan view of the trailing truck showing portions of the rear end of the locomotive structure proper; and Figure 3 is a combined front elevation of the trailing truck and transverse section thereof on the line a—a of Figure 1, the left hand portion being that which is in elevation and the right hand portion being that which is in section.

Referring to the drawings it will be seen that I have shown the rear half 1 of the last driving axle of the locomotive A together with its wheels 2. The axle is mounted as usual in the locomotive frame 3 and carries the customary springs 4 which form a part of the spring rigging of the locomotive proper.

The main frame 3 carries the extension 5 bolted or otherwise secured thereto which reaches out rearwardly beneath the fire box 6 and over the trailing truck B. It will be seen that the frame 7 of the truck is of a modified A-form in plan view and that it is pivoted at the point 8 to cross structure 9 between the rear ends of the main frames 3. Any desired type of centering rocker 10 may be used between the extensions 5 and the seats or pockets 11 at the rear of the frame 7.

A cross member 12 ties the rear ends of the frame 7 together and serves to support a locomotive booster C where such is desired but this forms no part of my present invention.

A portion of the superimposed weight of the locomotive is, of course, transmitted to the truck B through the centering rockers 10.

Over the axles 13 of the truck B are springs 14 the ends of which are coupled to the truck structure by means of suitable hangers 15 and equalizers 16. The hanger and equalizer construction at the front end of the truck is, however, of novel construction and will be particularly described.

At the forward end of each of the forward springs of the truck is a hanger 17. These two hangers support the cross or transverse equalizer 18.

Between this cross equalizer and the rear driving springs of the locomotive I prefer to use the short longitudinal equalizers 19 pivoted to the truck structure and connected at their forward ends to the hangers 20 which depend from the rear ends of the springs 4. In certain instances it might be advisable to replace the two hangers 20 with a single hanger of sufficient size to take the entire load at the center of the locomotive using, of course, another cross or transverse equalizer on the locomotive to which the forward ends of the equalizers 19 would then be secured.

It will be seen that the foregoing arrangement reduces to a minimum the distance between the rear driving wheel of the locomotive and the front wheel of the trailing truck. The equalizing system is extremely flexible and the wheel base of the locomotive is substantially reduced.

I claim:—

1. A locomotive trailing truck construction including in combination with the rear locomotive driving springs, a transverse equalizer on the truck and a longitudinal equalizer also on the truck between said transverse equalizer and each of said springs.

2. In a trailing truck the combination, with the locomotive spring rigging, of a cross equalizer on the truck and a longitudinal equalizer mounted on the truck between said cross equalizer and said rigging.

3. In a trailer truck the combination, with the locomotive spring rigging, of a spring over each end of the truck axle, a transverse equalizer on said truck between said springs, and a longitudinal equalizer also on the truck between said transverse equalizer and said rigging.

4. In a four wheel trailer truck the combination, with the rear locomotive driving springs, of a spring over each end of the truck axle adjacent the drivers, a transverse equalizer on the truck between said springs, and a longitudinal equalizer also on the truck between said transverse equalizer and each of said locomotive springs.

5. Locomotive construction comprising in combination with the rear pair of drivers, a trailing truck with an axle close to the axle of said drivers, spring rigging over said drivers, a spring over each end of said truck axle, a transverse equalizer on said truck between said springs and a longitudinal equalizer also on the truck between said transverse equalizer and said rigging.

In testimony whereof, I have hereunto signed my name.

HARRY S. VINCENT.